United States Patent [19]

Allard et al.

[11] 4,405,169
[45] Sep. 20, 1983

[54] FARM WAGON

[75] Inventors: Rene Allard, Victoriaville; Fernand Couture, Sherbrooke; Raynald Couture, Granby, all of Canada

[73] Assignee: La Compagnie Normand Ltee, St-Pascal, Canada

[21] Appl. No.: 246,207

[22] Filed: Mar. 23, 1981

[51] Int. Cl.³ .............................................. B60P 3/00
[52] U.S. Cl. ..................................... 296/3; 105/355; 296/14; 296/180; 410/118
[58] Field of Search ...................... 296/3, 6, 8, 11, 12, 296/13, 14, 180; 410/96, 117, 118, 156; 105/238 R, 355

[56] References Cited

U.S. PATENT DOCUMENTS

| 382,328 | 5/1888 | Roby | 296/6 |
| 1,765,204 | 6/1930 | Card | 296/180 |
| 2,015,879 | 10/1935 | Twente | 296/10 |
| 2,297,298 | 9/1942 | Freeman | 296/14 |
| 2,984,514 | 3/1958 | Lemley | 296/14 |
| 3,099,313 | 7/1963 | Peck | 410/118 |
| 4,067,298 | 1/1978 | Jones et al. | 119/60 |
| 4,078,523 | 3/1978 | Etzler | 119/58 |
| 4,139,230 | 2/1979 | Barrentine | 296/14 |

FOREIGN PATENT DOCUMENTS 1104612 7/1981 Canada.
13906 of 1905 United Kingdom.
23685 of 1915 United Kingdom.

Primary Examiner—Joseph F. Peters, Jr.
Assistant Examiner—John A. Carroll
Attorney, Agent, or Firm—Schwartz, Jeffery, Schwaab, Mack, Blumenthal & Koch

[57] ABSTRACT

An improved platform for a farm wagon, this platform having a deck composed of two sets of frame members, one mounted transversely and loosely on top of the other, and a plurality of deck panels loosely mounted on top of the top frame members. Sidewalls retain the deck panels in place so that the deck is flexible. A wagon incorporating this improved platform is also disclosed.

14 Claims, 12 Drawing Figures

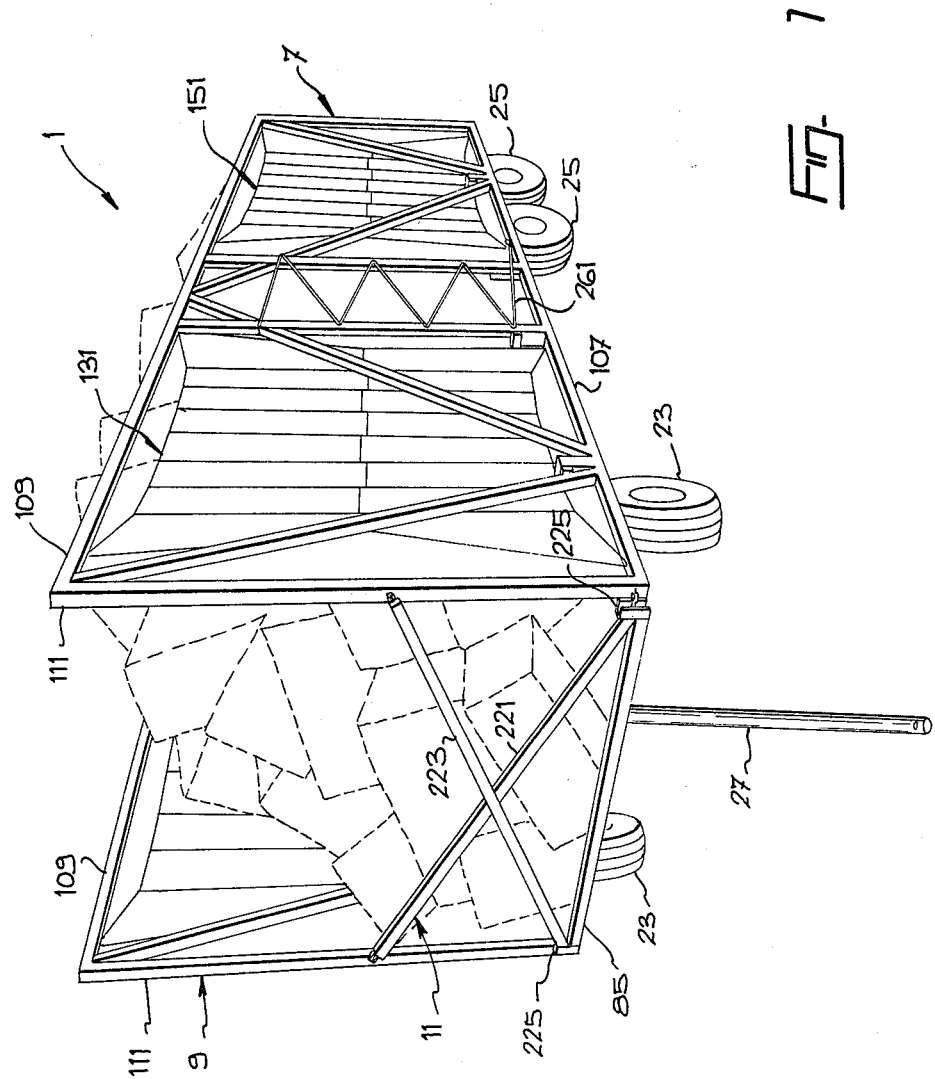

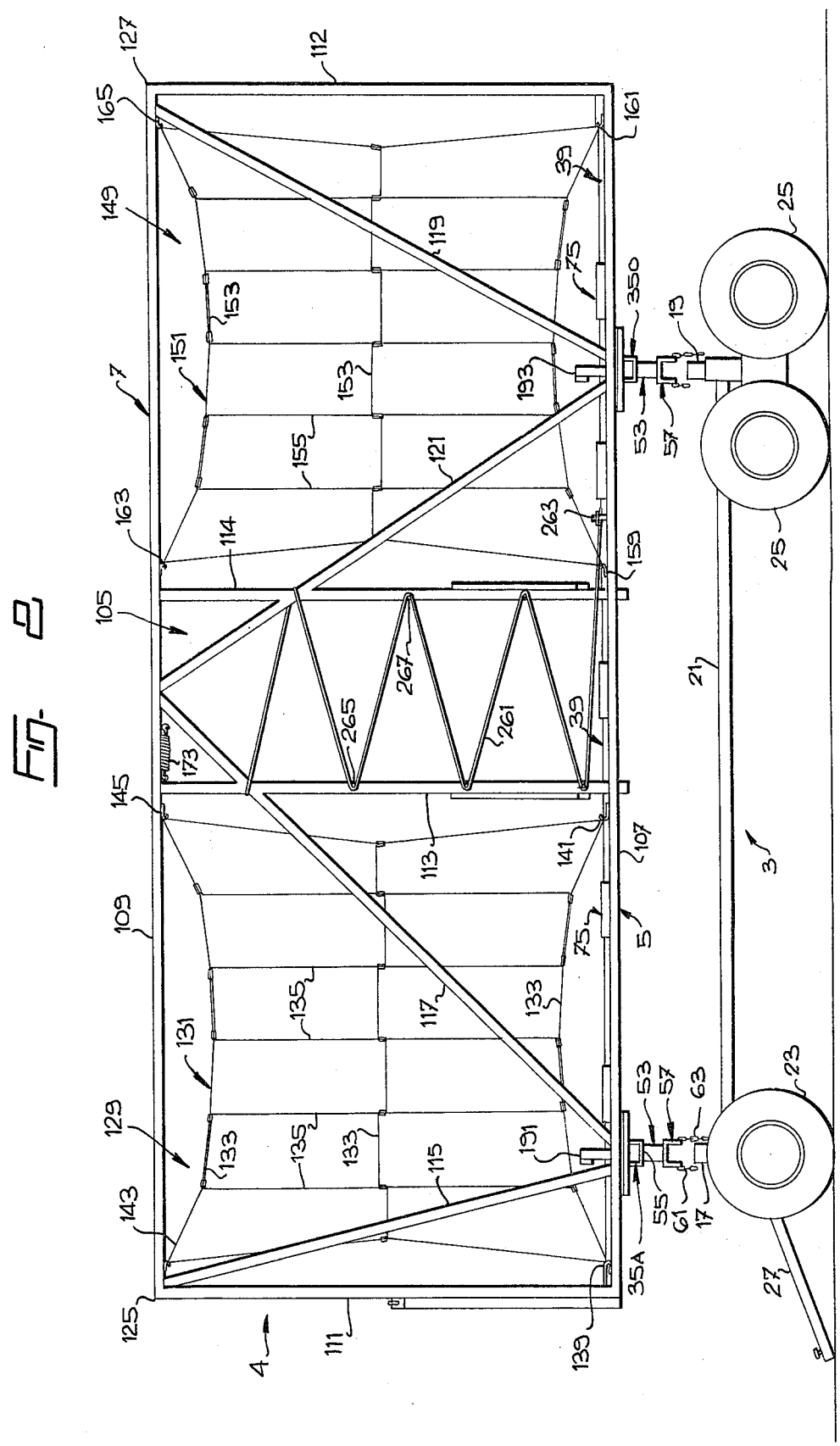

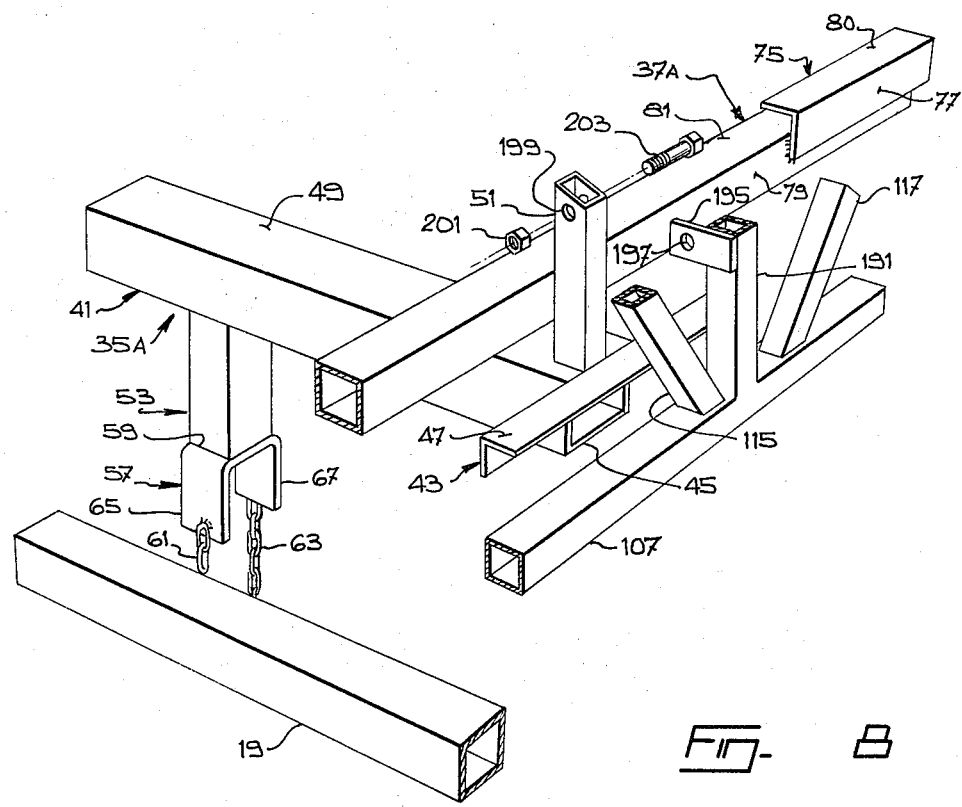
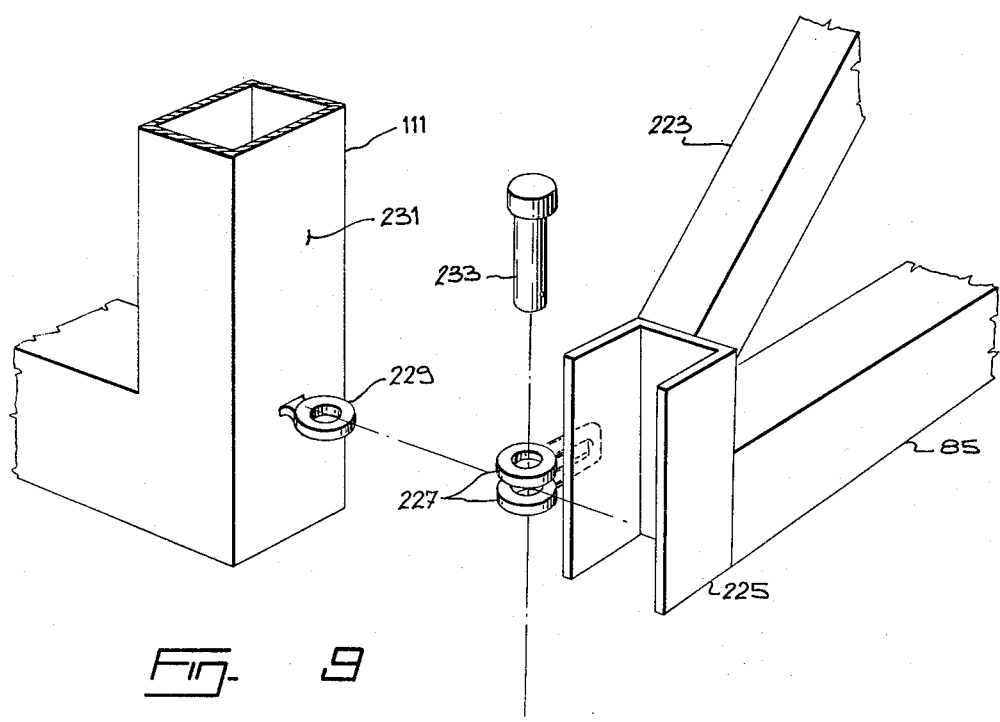

FARM WAGON

The present invention relates to an improved platform for a farm wagon.

The invention also relates to an improved farm wagon incorporating the improved platform.

Farm wagons, and more particularly hay wagons for use in harvesting bales of hay, are well known. Many of the known wagons are provided with platforms having sides which can fold down and/or which can be easily removed for storage and/or ease of access. Many of the known wagons are also constructed with platforms having sides that are flexible and light in weight. Examples of such wagons are shown in U.S. Pat. Nos. 382,328; 4,067,298 and 4,078,523 and in British Pat. Nos. 13,906 and 23,685.

All the known wagons are however constructed with a platform having a rigid deck. Such a platform require a very strong and generally massive frame and deck construction to withstand the stresses encountered in travelling over rough farmland. As a result, even with flexible and lightweight platform sides, the known wagons are very heavy and relatively expensive. Also, the wagon platform having a rigid deck, even if equipped with folding or removable sides, still takes up a large amount of storage and shipping space. In addition, many of the known wagons have platform sides that are awkward to handle and difficult to fold. Further, many of the known platform sides are quite elaborate in structure and thus relatively heavy and/or expensive.

It is an object of the present invention to provide an improved platform for a farm wagon which is light in weight while still being able to withstand rough farm usage.

It is another object of the invention to provide an improved wagon platform which can be shipped or stored in a knocked-down condition in a relatively small amount of space, and which can be readily assembled or set-up without requiring special tools or equipment.

It is a further object of this invention to provide an improved wagon having platform sides which are light in weight and simple in structure, yet strong enough to retain produce on the wagon.

It is yet another object of the invention to provide platform sides which can be easily erected or knocked down on the deck.

In accordance with the present invention, these objects are achieved with a wagon platform which is held together with a minimum of connectors or fasteners. The platform has a deck which comprises a top set of frame members supported transversely on a bottom set of frame members without the frame members being directly connected to each other. The sides of the platform are used to indirectly connect the two sets of frame members together. The platform deck also comprises a set of deck panels supported on the set of top frame members without being directly connected to them. Two sides of the platform in addition to retaining means on some of the top frame members maintain the deck panels loosely in place. The above deck construction permits the deck to twist and flex while the wagon is travelling over rough ground. Thus the deck is better adapted to handle stresses than if it were rigid. As a result of the flexibility, the deck can be made from lighter materials, thereby reducing the weight of the wagon. In addition, the above construction which permits the deck to be assembled with a minimum of fasteners, provides a deck which can be easily knocked down or set-up. Thus the deck can be shipped and/or stored in a minimum amount of space.

Advantageously, the sides of the platform each comprise a simple frame structure delimiting the shape of the sides. Cable networks are attached to the frame structure to close open areas within the frame structure. The combination of cable networks supported by a peripheral frame structure provide a platform having lightweight yet strong and easily handled sides. The sides are also arranged so that they can be readily erected or knocked down on the deck.

The invention is particularly directed toward a platform for a farm wagon, the platform having a deck, the deck including a set of bottom frame members and a set of top frame members supported by, but not directly connected to, the bottom frame members. A first pair of opposed side walls are connected to the bottom frame members and a second pair of opposed side walls are connected to the top frame members. The first and second pair of side walls are also connected to each other.

The invention is also particularly directed toward a farm wagon having a wheeled chassis and a platform mounted thereon. The platform has a deck with the deck including a set of bottom frame members and a set of top frame members supported by, but not directly connected to, the bottom frame members. The platform includes a first pair of opposed side walls connected to the bottom frame members and a second pair of opposed side walls connected to the top frame members. The first and second pair of side walls are also connected to each other.

A preferred embodiment of the invention will now be described in detail having reference to the accompanying drawings in which:

FIG. 1 is a perspective view of a farm wagon;

FIG. 2 is a side elevation view of the farm wagon shown in FIG. 1;

FIG. 8 is a detail perspective view showing the side wall connection to the deck;

FIG. 9 is a detail perspective view showing the connecting joining the walls;

Figure 3:
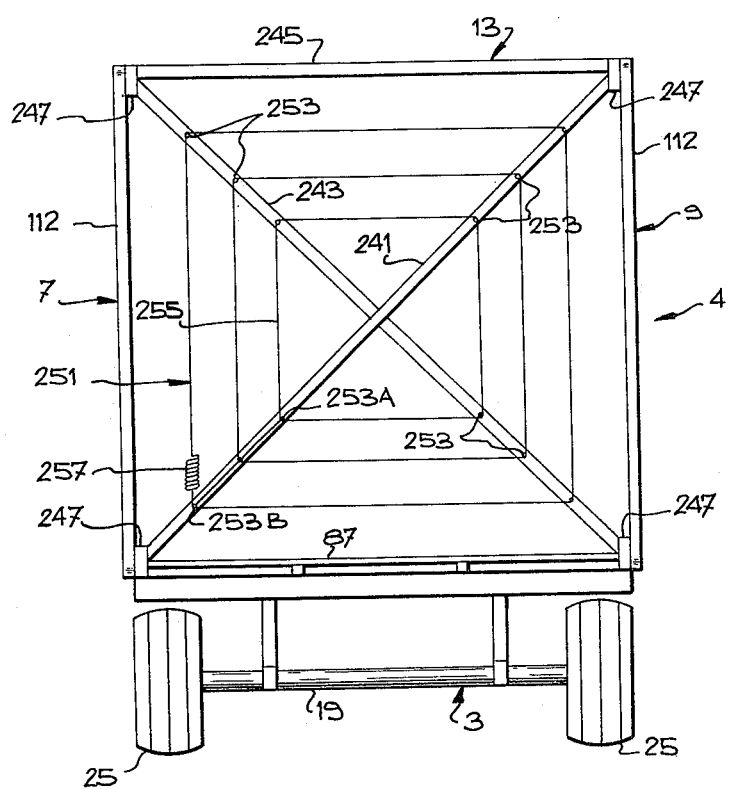
FIG. 3 is a rear elevation view of the farm wagon shown in FIGS. 1 and 2.
Figure 5:
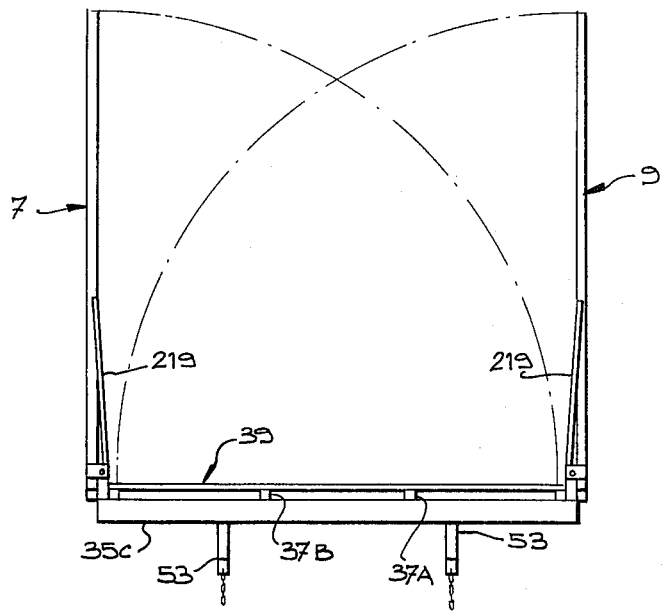
FIG. 5 is a view similar to FIG. 4 showing the side walls raised.

The farm wagon 1, as shown in FIGS. 1 to 3, has a chassis 3 and a platform 4 mounted thereon. The platform 4 includes a deck 5 and produce retaining walls mounted on the deck 5 to hold produce therein. The retaining walls include a first pair of side walls 7, 9, hinged to the sides of the deck 5, and a second pair of side or end walls 11, 13. The end walls 11, 13 are also connected with the deck 5 and are further detachably connected to the first pair of side walls 7, 9.

In more detail, the chassis 3 has a front chassis member 17 and a rear chassis member 19. The front and rear chassis members 17, 19 are joined together by a pair of side frame members 21. A pair of front wheels 23 are mounted on an axle (not shown) which axle is pivotably mounted to the front chassis member 17. Two pairs of rear wheels 25 are mounted on axles (not shown) which in turn are fixed to the rear chassis member 19. A wagon tongue 27 is pivotably mounted on the front axle (not shown) and projects forwardly therefrom.

Figure 7:
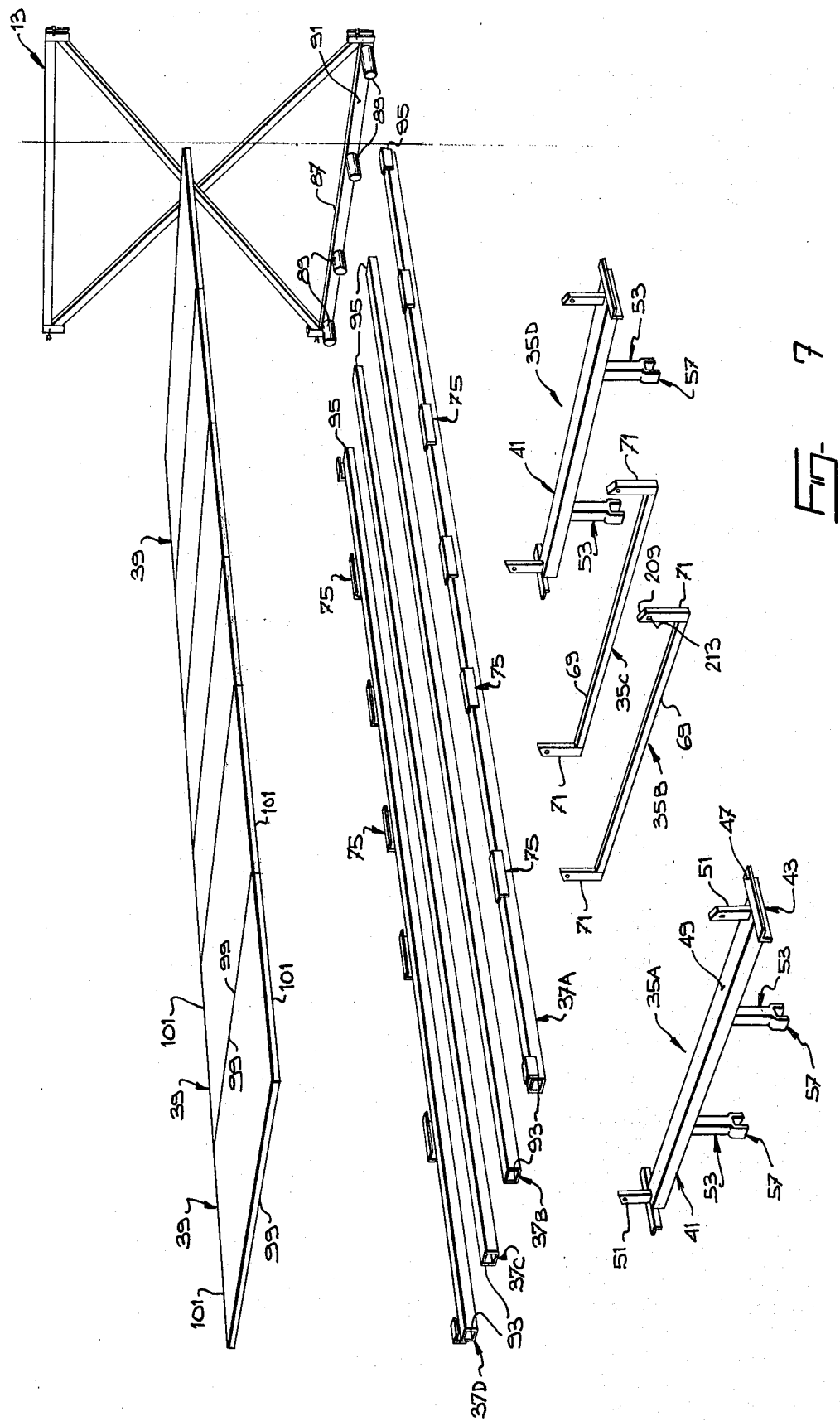
FIG. 7 is an exploded perspective view of the deck.

The deck 5 of platform 4, as shown in FIG. 7, includes a set of bottom frame members. The bottom frame members extend across the deck and are spaced longitudinally of the deck. Four main frame members 35a, 35b, 35c, 35d preferably are used with the two outer main frame members 35a, 35d located over the front and rear chassis members 17, 19 respectively and with the two inner main frame members 35b, 35c located in the middle area of the deck 5. The outer, bottom frame members 35a, 35d, are fastened to the chassis members 17, 19 and the inner, bottom frame members 35b, 35c are supported by the first side walls 7, 9 in a manner to be described.

The deck 5 also includes a set of upper frame members. The upper frame members extend longitudinally of the deck 5 and are spaced apart transversely across the deck. Four upper frame members 37a, 37b, 37c, 37d preferably are used, these upper frame members resting on, and extending perpendicular to, the bottom frame members 35a, 35b, 35c, 35d. The upper frame members 37a, 37b, 37c, 37d are held in place by the second set of side or end walls 11, 13 as will be described.

The deck 5 also includes a set of deck panels 39 which are carried by the upper frame members 37a, 37b, 37c, 37d in a manner to be described. The deck panels 39 are retained on the upper frame members by the end walls 11, 13.

Figure 10:
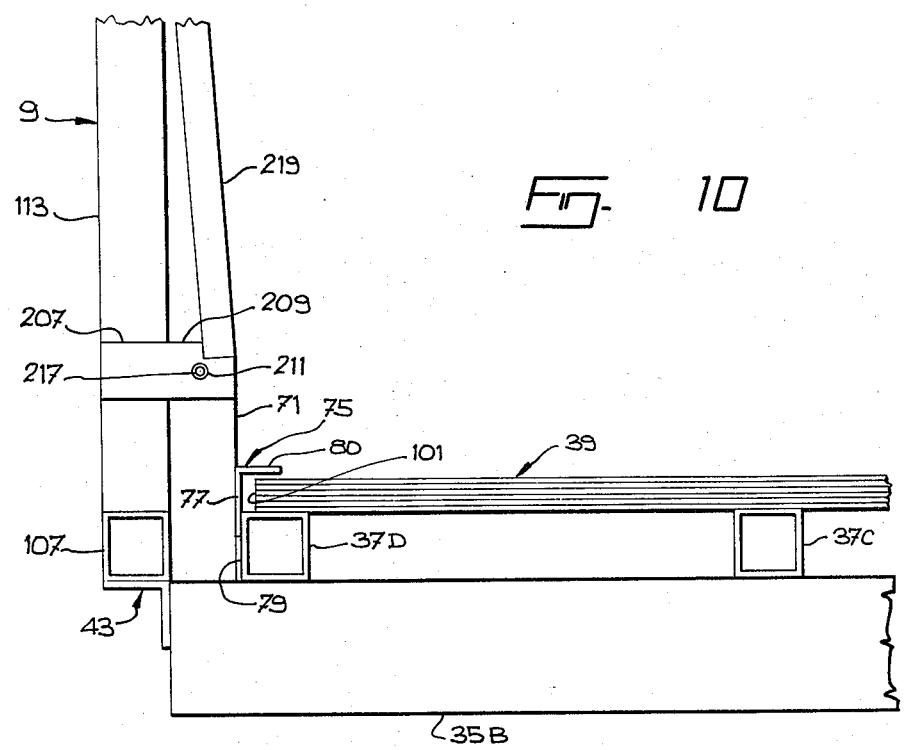
FIG. 10 is a detail view of the deck.

In more detail, the outer, bottom frame members 35a, 35d of the deck are identical and each preferably comprises a tube 41 having a square cross-section. A sidewall support 43 in the form of a short angle section, as shown more clearly in FIGS. 8 and 10, is fixed to each end 45 of the tube 41. Each sidewall support 43 extends longitudinally of the deck and has a top surface 47 flush with the top surface 49 of the tube 41. A pair of short, sidewall mounting posts 51 project upwardly from the top surface 49 of the tube. A pair of spaced apart legs 53 extend down from the bottom surface 55 of the tube 41. A downwardly opening U-shaped mounting member 57 is fixed to the lower end 59 of each leg 53. The U-shaped member 57 is sized to fit snugly over the front or rear chassis members 17, 19 to mount the platform 4 on the chassis 3. Short lengths 61, 63 of chain fixed to the arms 65, 67 respectively of the mounting member 57 are joined together about the chassis members 17, or 19 to hold the platform 4 to the chassis 3.

The inner bottom frame members 35b, 35c are also identical. Each comprises a tube 69 having a square cross-sectional shape with a short, sidewall mounting post 71 at each end of tube 69 projecting upwardly therefrom. The mounting posts 71 are used to connect each inner, bottom frame member 35b, 35c to the sidewalls 7, 9 as will be described.

Each upper frame member 37a, 37b, 37c, 37d comprises a tubular frame member having a square cross-sectional shape. The two outer, upper frame members 37a, 37d have means thereon for retaining the deck panels 39. The retaining means can comprise angle members 75. Each angle member 75 is fastened to the outer, upper frame members 37a, 37d by one leg 77 welded or otherwise affixed against the outer side 79 of the frame members 37a, 37d as shown in FIG. 8. The other leg 80 of the angle member 75 overlies the top side 81 of the frame members 37a, 37d and is spaced above the top side 81 a distance slightly greater than the thickness of the deck panels 39. The angle members 75 are located at the ends of the outer upper frame members 37a, 37d and at the locations where the deck panels 39 abut one another.

The upper frame members 37a, 37b, 37c, 37d are held in place by the end walls 11, 13 as previously stated. Each end wall 11, 13 has a bottom rail 85, 87 respectively. The bottom rails 85, 87 are each slightly longer than the width of the deck and have a tubular construction with a quadrangular cross-sectional shape. Each rail 85, 87 has a set of spaced-apart pins 89 projecting inwardly from its inner surface 91 (only the pins on rail 87 of back end wall 13 are shown-see FIG. 7). The pins 89 are sized to fit snugly in the open front and back ends 93, 95 of the tubular upper frame members 37a, 37b, 37c, 37d. With the upper frame members securely held in place between the end walls 11, 13, and with the end walls 11, 13 held in place by the side walls 7, 9, as will be described, a relatively stable platform is provided for the deck panels 39.

Figure 4:
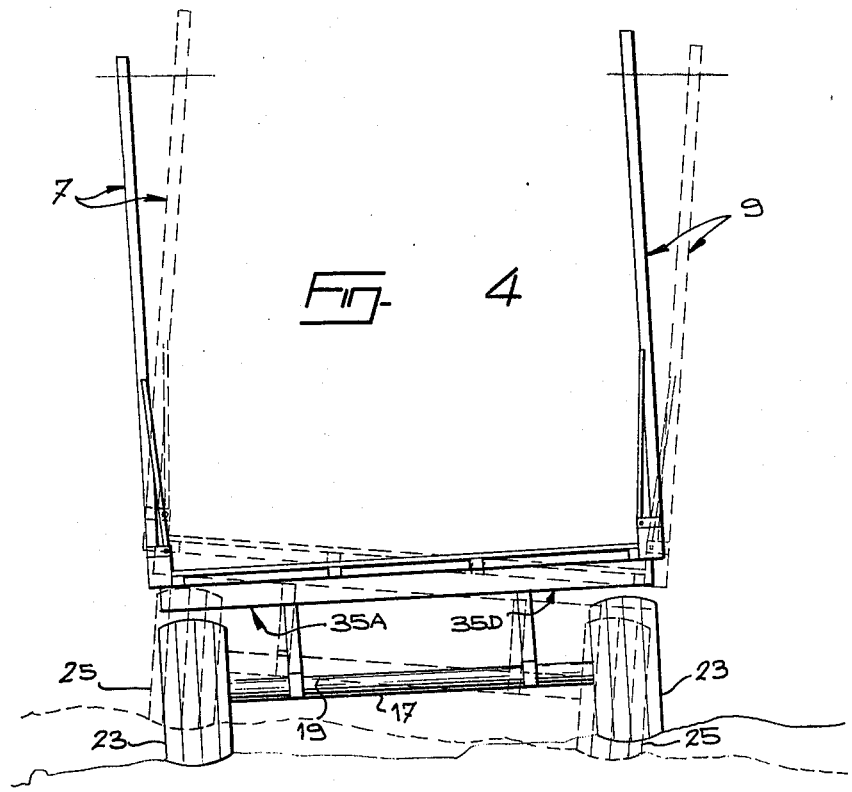
FIG. 4 is a rear elevation view of the wagon, without the rear wall, showing how the platform can flex.

The deck panels 39 can comprise rectangular sheets of plywood, or sheets of other suitable decking material. The panels 39 are mounted on top of the upper frame members 37a, 37b, 37c, 37d with their side edges 99 adjacent each other and with their end edges 101 loosely under the legs 79 of the retaining angle members 75. Spacers (not shown) can be provided between the panels 39 so they do not abut. The panels 39 are held in place on the upper frame members between the angle members 75 and the end walls 11, 13. No other panel connection means are necessary. It will thus be seen that the top frame members are free to move slightly with respect to the bottom frame members. Also the panels are free to move slightly with respect to the frame members. Thus the deck 5 can flex or twist as shown in exaggerated manner in FIG. 4.

Each first side wall 7, 9 is identical and comprises tubular framing defining an open construction, rectangular-shaped wall with a centrally located loading opening 105 therein. In more detail, as shown in FIG. 2, each first side wall 7, 9 has a bottom tubular rail 107, a top tubular rail 109 and vertical end rails 111, 112 joining the top and bottom rails 107, 109 together. A pair of spaced-apart vertical intermediate rails 113, 114 extend between the top and bottom rails 107, 109 to define the central opening 105. A first pair of diagonal reinforcing rails 115, 117 extend up from the bottom rail 107 in the vicinity of the front bottom frame member 35a, and a second pair of diagonal reinforcing rails 119, 121 extend up from the bottom rail 107 in the vicinity of the back bottom frame member 35d. One rail 115 of the first pair of reinforcing rails extends to the top front corner 125 of the side wall and is joined there to the other rails 119, 111. One rail 119 of the second pair of reinforcing rails extends to top, back corner 127 of the side wall and is joined to the other rails 109, 112 there. The other two diagonal reinforcing rails 117, 121 intersect the intermediate rails 111, 113 near their top end and meet together at the top rail 109 where all three are joined together.

The front opening 129 in the side wall 7 between front rail 111 and intermediate rail 113 is closed by a first cable network 131. This cable network 131 consists of a plurality of horizontal cable runs 133 and vertical cable runs 135, joined together to define a rectangular pattern which substantially fills the opening 129. The horizontal and vertical cable runs 133, 135 are spaced apart a distance sufficient to retain produce, such as hay bales, on the wagon. The corners 139, 141, 143, 145 of the cable network 131 are fastneed to hooks located on the bottom and top rails 107, 109 by the corners of the opening 129 to retain the cable network tautly within the opening.

The back opening 149 in the sidewall 7 between the back intermediate rail 114 and the back rail 112 is also closed by a second cable network 151 similar to the first cable network 131. This second cable network 151 also consists of a plurality of horizontal cable runs 153 and vertical cable runs 155 joined together to define a rectangular pattern which substantially fills the opening 151. The corners 159, 161, 163, 165 of this second cable network are also fastened to hooks located on the top and bottom rails 107, 109 by the corners of the opening 151.

If desired the upper, inner corners 145, 163 of both cable networks 131, 151 can be connected to each other via a spring 173. As shown in more detail in FIG. 11, a short run of cable 175 leads from corner 145 of cable network 131 through a guide 177 on top rail 109 to one end 179 of spring 173 located at the top of loading opening 105. Another short run of cable 181 leads from corner 163 of cable network 151 through a guide 183 on top rail 119 to the other end 185 of spring 173. The spring 173 equalizes tension between the cable networks 131, 151 and keeps them taut within the openings.

Each first side wall 7, 9 is pivotally mounted to the deck 5 so that the sidewalls 7, 9 can be folded onto the deck for storage. A short pair of mounting posts 191, 193 project up from the bottom rail 107 of each side wall, as shown in FIG. 2. One post 191 is located in the front opening 129 between rails 115, 117 and the other post 193 located in the rear opening 149 between rails 119, 121. Posts 191 are hingedly connected to the posts 51 on front bottom frame member 37a, and posts 193 are hingedly connected to the posts 51 on rear bottom frame member 37d. In more detail, as shown in FIG. 8, each post 191, 193 has a mounting plate 195 fixed adjacent its top end and projecting inwardly to lie adjacent the post 51. A hole 197 in the plate 195 is aligned with a through hole 199 in the post 51. A nut 201 and bolt 203 hingedly connects plate 195 to post 51 with the bolt 203 passing through holes 197, 199.

The intermediate rails 113, 114 of each sidewall 7, 9 are also aligned with the support posts 71 on the inner bottom frame members 35b, 35c. As shown in FIG. 10, a mounting plate 207 is fixed to the side of each intermediate rail 113, 114 and extends inwardly to lie against the side of a support post 71 adjacent to its end 209. A hole 211 is provided in the free end of plate 207 which hole is aligned with a through hole 213 in the top end of post 71. A nut (not shown) and bolt 217 hingedly connect the plate 207 and post 71 together. If desired, a reinforcing bar 219 can be fixed at one end to the outer end of the plate 207, and at its other end to the intermediate rail 113, 114 part way up its height to lend some rigidity to the rails 113, 114.

Each first side wall 7, 9, in the upright position, rests on the support flanges 43 at the ends outer bottom frame members 35a, 35d. The side walls 7, 9 also carry the inner bottom frame members 35b, 35c via bolts 217. When the side walls 7, 9 are to be stored. They are pivoted about the bolts 203, 217 held by short, rigid posts 51, 71.

The front wall 11 of the wagon 1 can include a pair of closure bars 221, 223 extending up from the ends of the bottom rail 85. The bars 221, 223 extend diagonally in opposite directions. A short vertical corner post 225 connects the lower end of each bar 221, 223 to the ends of the bottom rail 85. A pair of first fastening rings 227 project from each corner post 225. The first rings 227 on each corner post 225 receive a second fastening ring 229 therebetween which second ring projects from the outer surface 231 of the front vertical bars 111 of each side wall 7, 9 as shown in FIG. 9. When the rings 227, 229 are aligned, a pin 233 is passed through them to detachably connect the lower corners of the front wall 11 to the front ends of the sidewalls 7, 9. The free ends 235, 237 of the bars 221, 223 are detachably fastened, by suitable fasteners, to the front vertical bars 111 of the side walls 7, 9. Fasteners similar to rings 227, 229 and pin 233 may be used. The closure bars 221, 223 are fastened to the side wall bars 111 about midway along the side wall bars. An opening is thus left above the front wall between the side walls for leading produce into the wagon.

The back wall 13 also has a pair of closure bars 241, 243 extending up from its bottom rail 87 as shown in FIG. 3. The bars 241, 243 extend diagonally in either direction from the ends of the bottom rail 87. The upper ends of the closure bars 241, 243 are joined together by a top rail 245 which extends parallel to the bottom rail 87. A short vertical corner post 247 is provided at the ends of both upper and lower rails 245, 87 to which posts the ends of the closure bars 241, 243 are joined. Suitable connecting means, which means can be similar to the fastening rings and pins used on the front wall, can be used to detachably fasten the corners of the rear wall 13 to the top and bottom of the back rails 112 of both side walls 7, 9.

A cable network 251 is employed to close the back wall 13. A set of spaced-apart hooks 253 can be provided on the outer surface of each hald on each closure bar 241, 243. A cable 255 then hooked at one end onto one of the hooks 253a closest of the center of the wall 13. The cable 255 is then wound about the hooks in the pattern of squares or rectangles of increasing size. The other end of the cable 255 is fixed to a spring 257 which in turn is fixed a hook 253b the farthest from the center of the wall. The spring 257 maintains the cable 255 tight. The cable pattern is selected to close the spaces between the closure bars 241, 243, the top and bottom rails 245, 87, and the side walls 7, 9 to prevent produce from falling out.

The loading opening 105 in the side walls 7, 9 can be closed with an elastic cable 261 which is fastened at one end to a hook 263 on the bottom rail 107 of the side wall adjacent the opening 105. From hook 263, the cable 261 is passed over hooks 265, 267 on the outer surface of the intermediate rials 113, 114 in zigzag fashion to close the opening as shown in FIG. 2.

Figure 6:
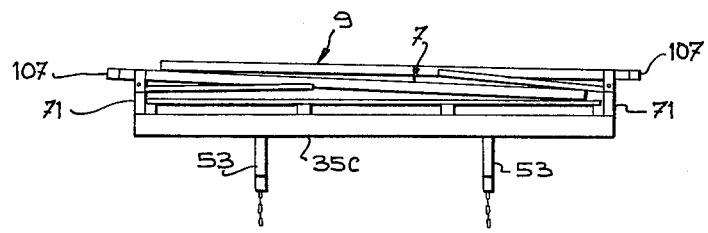
FIG. 6 is a view similar to FIG. 5 but showing the side walls folded.

The construction of the wagon provides a structure which is light in weight, yet sturdy enough to retain produce therein when fully loaded. The end walls 11, 13 are easily removed for storage and the side walls fold down onto the deck about the posts as shown in FIG. 6 to overlie one another.

Figure 11:
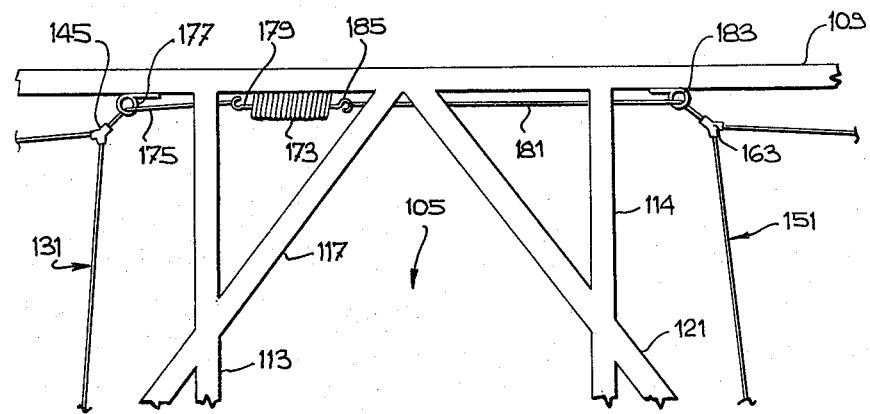
FIG. 11 is a detail view of the side wall.
Figure 12:
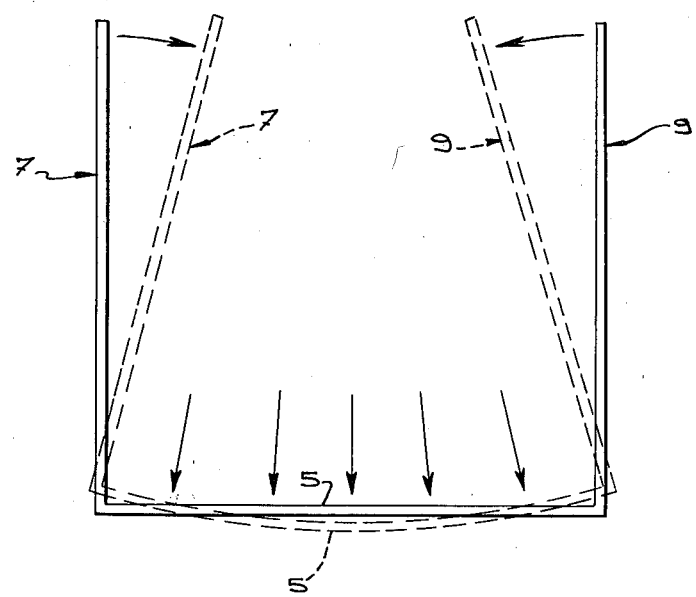
FIG. 12 is an end view of the platform showing, in exaggerated manner, the configuration it takes on loading the wagon.

The deck 5 is extremely flexible, yet rigid enough to carry a load, as a result of its unique construction since no fasteners are employed to directly connect the top and bottom deck frame members and the deck panels together. In addition, by mounting the side walls 7, 9 onto the short rigid posts 51, 71, the side walls tend to bow in slightly in the center of the wagon when the wagon is loaded as shown in FIG. 11. As the wagon is loaded, the deck 5 sags slightly in the middle, thereby angling the mounting posts 51, 71 inwardly and thus drawing the side walls 7, 9 inwardly, as shown in exaggerated form in FIG. 11. This arrangement helps to retain produce within the wagon with less stress since the side walls are not bowed outwardly as much by the produce as is normal. The tendency to draw the side walls inwardly counteracts the normal tendency of the walls to bow outwardly.

We claim:

1. A platform for a farm wagon, said platform comprising:

a deck, the deck including a set of bottom frame members defining a first plane, and a set of top frame members defining a second plane, said top frame members being movably supported by the bottom frame members such that said first and second planes are substantially parallel;

a first pair of opposed side walls connected to the bottom frame members and a second pair of opposed side walls connected to the top frame members;

means for fastening said first pair of side walls to said second pair of side walls to indirectly fasten said top frame members to said bottom frame members whereby said top and bottom frame members are held in position by said first and second pairs of side walls, yet are movable relative to one another when flexed;

a set of deck panels supported on the top frame members; and means for maintaining the deck panels on the top frame members such that said deck panels can move relative to said top frame members when said deck is flexed.

2. A platform as claimed in claim 1, wherein the bottom frame members are spaced apart longitudinally of the deck and the top frame members are spaced apart transversely of the deck, each deck panel extending across the width of the deck.

3. A platform as claimed in claim 2, wherein the first pair of side walls are each pivotally connected to the bottom frame members; the second pair of side walls being detachably connected to the upper frame members to maintain them in spaced-apart position and to the first side walls, the second side walls holding the deck panels between them.

4. A platform as claimed in claim 3, wherein each bottom frame member has a short support post projecting up from each end, each first side wall having connecting means above its bottom edge adjacent the top end of each post adjacent the first side wall, and pivot means joining the connecting means on each first side wall to the top end of each post adjacent the first side wall.

5. A platform as claimed in claim 3 or 4, wherein each top frame member is tubular and open at each end, each second side wall having spaced-apart pin means along its lower edge adapted to snugly fit into the open ends of the tubular top frame members.

6. A platform as claimed in claim 3 or 4, wherein the corners of the second side walls carry means cooperating with means on the ends of the first side walls to receive pins detachably connecting the walls together.

7. A platform as claimed in claim 2, wherein the maintaining means includes longitudinally spaced apart retaining means on the outer top frame members for retaining the deck panels by their end edges on the top frame members.

8. A platform as claimed in claim 2, including means on two of the bottom frame members for detachably connecting the deck to a chassis.

9. A platform as claimed in claim 1, wherein each first side wall has framing means defining a centrally located loading opening and an open area on each side of the loading opening, each open area closed by a cable network fastened to the framing means.

10. A platform as claimed in claim 9, wherein the cable networks in each open area are joined together by spring means at the top of the loading opening.

11. A platform as claimed in claim 1, wherein one of the second side walls has a top and bottom rail joined by a pair of crossed rails, and a cable network is mounted on the crossed rails to fill the space between the crossed rails.

12. A farm wagon having a wheeled chassis and a platform mounted on the chassis, said platform comprising:

a deck, the deck including a set of bottom frame members and a set of top frame members, said top frame members being movably supported by the bottom frame members;

a first pair of opposed side walls connected to the bottom frame members and a second pair of opposed side walls connected to the top frame members means for fastening said first pair of side walls to said second pair of side walls whereby said top frame members are indirectly fastened to said bottom frame members and are movable relative to one another when flexed;

a set of deck panels movably supported on the top frame members; and means for maintaining the deck panels on the top frame members such that said deck panels can move relative to said top frame members when said deck is flexed.

13. A farm wagon as claimed in claim 12, wherein the first pair of side walls are each pivotally connected to the bottom frame members, the second pair of side walls detachably connected to both the upper frame members and to the first pair of side walls to maintain them in a raised position, the second pair of side walls holding the deck panels between them.

14. A farm wagon as claimed in claim 13, including means depending downwardly from two of the bottom frame members to detachably connected the platform to the chassis.

* * * * *